United States Patent
Sidorovich Paradiso et al.

(10) Patent No.: US 12,523,175 B1
(45) Date of Patent: Jan. 13, 2026

(54) FLAME PROTECTION SEALS FOR GAS TURBINE ENGINES

(71) Applicant: Pratt & Whitney Canada Corp., Longueuil (CA)

(72) Inventors: Ivan Sidorovich Paradiso, Toronto (CA); Daniel Alecu, Ottawa (CA)

(73) Assignee: PRATT & WHITNEY CANADA CORP., Québec (CA)

( * ) Notice: Subject to any disclaimer, the term of this patent is extended or adjusted under 35 U.S.C. 154(b) by 0 days.

(21) Appl. No.: 18/985,241

(22) Filed: Dec. 18, 2024

(51) Int. Cl.
*F02C 7/28* (2006.01)
*F02C 7/20* (2006.01)
*F02C 9/18* (2006.01)

(52) U.S. Cl.
CPC .............. *F02C 7/28* (2013.01); *F02C 7/20* (2013.01); *F02C 9/18* (2013.01); *F05D 2240/55* (2013.01); *F05D 2260/606* (2013.01); *F05D 2270/09* (2013.01)

(58) Field of Classification Search
CPC ...... F02C 7/28; F02C 7/20; F02C 7/22; F02C 7/222; F02C 9/18; F05D 2240/55; F05D 2260/606; F05D 2270/09; F01D 25/183
See application file for complete search history.

(56) References Cited

U.S. PATENT DOCUMENTS

| | | | |
|---|---|---|---|
| 3,642,295 A * | 2/1972 | Cohen | F01D 11/005 415/199.5 |
| 4,658,847 A | 4/1987 | McCrone | |
| 7,497,443 B1 | 3/2009 | Steinetz et al. | |
| 8,328,160 B2 | 12/2012 | Abel et al. | |
| 9,982,821 B1 * | 5/2018 | Scheiferstein | F16L 21/035 |
| 10,132,246 B2 * | 11/2018 | Lior | F02C 9/18 |
| 11,384,659 B2 * | 7/2022 | Morenko | F01D 9/06 |
| 12,215,588 B2 * | 2/2025 | Singh | F01D 11/025 |
| 12,352,176 B1 * | 7/2025 | Freeman | F01D 25/246 |
| 2011/0284784 A1 * | 11/2011 | Abel | F16K 5/201 62/50.7 |
| 2016/0208696 A1 * | 7/2016 | Larson | F02C 7/06 |

(Continued)

FOREIGN PATENT DOCUMENTS

| | | | | |
|---|---|---|---|---|
| CA | 3118622 A1 * | 2/2022 | | F01D 9/065 |
| CA | 3128699 A1 * | 4/2022 | | F16L 27/1274 |

(Continued)

*Primary Examiner* — Craig Kim
(74) *Attorney, Agent, or Firm* — CANTOR COLBURN LLP (57) ABSTRACT

Gas turbine engines include an engine core having compressor, combustor, and turbine sections arranged within an engine casing. A transfer tube is arranged on an exterior of the casing and configured to define a fluid conduit for fluid to be transferred about the engine. A fitting is connected to the transfer tube and a seal assembly is arranged between the fitting and the transfer tube. The seal assembly provides a fluid seal between the fluid conduit and an ambient environment at a connection between the fitting and the transfer tube. The seal assembly includes a primary seal arranged in a gap between the fitting and the transfer tube and a secondary seal arranged in the gap between the primary seal and an ambient environment. The secondary seal is configured to expand into engagement with the fitting and the transfer tube when exposed to temperatures of at least 800° F.

20 Claims, 6 Drawing Sheets

(56) References Cited

U.S. PATENT DOCUMENTS

| | | | | |
|---|---|---|---|---|
| 2018/0355746 A1* | 12/2018 | Barra | .................... | F04D 29/584 |
| 2021/0025496 A1* | 1/2021 | Kwoka | ...................... | F02C 7/32 |
| 2021/0025527 A1* | 1/2021 | Davis | ........................ | F02C 7/06 |
| 2022/0082030 A1* | 3/2022 | Morenko | ................ | F01D 25/24 |
| 2022/0127974 A1* | 4/2022 | Lefebvre | ............. | F16L 27/1274 |
| 2023/0203964 A1* | 6/2023 | Massicotte | ............ | F01D 21/003 |
| | | | | 415/118 |
| 2024/0392726 A1* | 11/2024 | Temelie | ................ | F16L 19/025 |

FOREIGN PATENT DOCUMENTS

| | | | | | |
|---|---|---|---|---|---|
| CN | 107917441 B | * | 6/2021 | ................ | F02C 7/28 |
| CN | 116877277 A | * | 10/2023 | ................ | F02C 7/28 |
| DE | 112015006063 T5 | * | 10/2017 | ............... | F16J 15/16 |
| DE | 102024137307 A1 | * | 6/2025 | ................ | F02C 7/06 |
| GB | 2588896 A | * | 5/2021 | ........... | F16J 15/0893 |

* cited by examiner

FLAME PROTECTION SEALS FOR GAS TURBINE ENGINES

BACKGROUND

Illustrative embodiments pertain to the art of gas turbine engines, and specifically to seals and fire protection for gas turbine engines.

Gas turbine engines are configured to combust fuel with air to generate a drive force for rotationally driving shafts and associated components to produce thrust for flight. The engines are configured with transfer tubes for conveying fuel or other volatile or flammable fluids (e.g., liquids and/or gases) to a combustor or to other locations on the engine and/or associated with the engine and/or aircraft. A transfer tube may contain flammable liquids, like oil or fuel, and can overheat or pose a fire danger to the engine. The transfer tubes are typically made of metal materials and may include seals for ensuring the fluids do not leak from the tubes. For example, rubber O-rings may be used to provide a seal to prevent leakage of the fluids. O-rings are made of rubber and thus have a low melting point and/or the O-rings can deform, soften, melt or the like during high temperature engine operation. Unexpected high temperature and/or flame events can result in a loss of seal integrity. If the seal integrity reduces, the seals may no longer maintain a proper seal which can result in leakages. Leakages of the fluids from the transfer tubes into the engine environment (e.g., high temperature environment) can result in damage to the engine or other negative impacts (e.g., engine shut down, expansion of a fire, etc.). Improving sealing and fire protection systems onboard aircraft engines can improve safety and provide for improved engine longevity.

BRIEF DESCRIPTION

According to some embodiments, gas turbine engines are provided. The gas turbine engines include an engine core having a compressor section, a combustor section, and a turbine section, an engine casing housing the engine core, a transfer tube arranged on an exterior of the engine casing and configured to define a fluid conduit for fluid to be transferred about the engine core, a fitting connected to the transfer tube, and a seal assembly arranged between a surface of the fitting and a surface of the transfer tube, the seal assembly providing a fluid seal between the fluid conduit and an ambient environment at a connection between the fitting and the transfer tube. The seal assembly includes a primary seal arranged in a gap between the fitting and the transfer tube and configured to provide a fluid seal between the surface of the fitting and the surface of the transfer tube, and a secondary seal arranged in the gap between the primary seal and an ambient environment, wherein the secondary seal is configured to expand into engagement with the fitting and the transfer tube when exposed to temperatures of at least 800° F.

In addition to one or more of the features described above, or as an alternative, further embodiments of the gas turbine engines may include that the primary seal is formed from at least one of rubber or plastic.

In addition to one or more of the features described above, or as an alternative, further embodiments of the gas turbine engines may include that the secondary seal comprises an expansion core and an outer shell.

In addition to one or more of the features described above, or as an alternative, further embodiments of the gas turbine engines may include that the expansion core has a thermal expansion ratio that is greater than a thermal expansion ratio of the outer shell.

In addition to one or more of the features described above, or as an alternative, further embodiments of the gas turbine engines may include that expansion ratio of the expansion core is at least seven times the expansion ratio of the outer shell.

In addition to one or more of the features described above, or as an alternative, further embodiments of the gas turbine engines may include that the outer shell comprises a split-line that separates during expansion of the expansion core.

In addition to one or more of the features described above, or as an alternative, further embodiments of the gas turbine engines may include that the expansion core is formed from a fluoroelastomer.

In addition to one or more of the features described above, or as an alternative, further embodiments of the gas turbine engines may include that the outer shell is formed from a metal.

In addition to one or more of the features described above, or as an alternative, further embodiments of the gas turbine engines may include that at least one of the transfer tube and the fitting comprise a primary seal channel for seating the primary seal and a secondary seal channel for seating the secondary seal.

In addition to one or more of the features described above, or as an alternative, further embodiments of the gas turbine engines may include that the secondary seal comprises an expansion band.

In addition to one or more of the features described above, or as an alternative, further embodiments of the gas turbine engines may include that the expansion band is formed from nitinol.

In addition to one or more of the features described above, or as an alternative, further embodiments of the gas turbine engines may include that the secondary seal forms an interference fit with surfaces of the transfer tube and the fitting after exposure to the temperatures of at least 800° F.

According to some embodiments, transfer tube assemblies for use on gas turbine engines are provided. The transfer tube assemblies include a transfer tube configured to define a fluid conduit for fluid to be transferred therethrough, a fitting connected to the transfer tube, and a seal assembly arranged between a surface of the fitting and a surface of the transfer tube, the seal assembly providing a fluid seal between the fluid conduit and an ambient environment at a connection between the fitting and the transfer tube. The seal assembly includes a primary seal arranged in a gap between the fitting and the transfer tube and configured to provide a fluid seal between the surface of the fitting and the surface of the transfer tube, and a secondary seal arranged in the gap between the primary seal and an ambient environment, wherein the secondary seal is configured to expand into engagement with the fitting and the transfer tube when exposed to temperatures of at least 800° F.

In addition to one or more of the features described above, or as an alternative, further embodiments of the transfer tube assemblies may include that the primary seal is formed from at least one of rubber or plastic.

In addition to one or more of the features described above, or as an alternative, further embodiments of the transfer tube assemblies may include that the secondary seal comprises an expansion core and an outer shell.

In addition to one or more of the features described above, or as an alternative, further embodiments of the transfer tube assemblies may include that the expansion core has a thermal expansion ratio that is greater than a thermal expansion ratio of the outer shell.

In addition to one or more of the features described above, or as an alternative, further embodiments of the transfer tube assemblies may include that expansion ratio of the expansion core is at least seven times the expansion ratio of the outer shell.

In addition to one or more of the features described above, or as an alternative, further embodiments of the transfer tube assemblies may include that the outer shell is formed from a metal.

In addition to one or more of the features described above, or as an alternative, further embodiments of the transfer tube assemblies may include that at least one of the transfer tube and the fitting comprise a primary seal channel for seating the primary seal and a secondary seal channel for seating the secondary seal.

In addition to one or more of the features described above, or as an alternative, further embodiments of the transfer tube assemblies may include that the secondary seal comprises an expansion band.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be illustrative and explanatory in nature and non-limiting.

BRIEF DESCRIPTION OF THE DRAWINGS

The following descriptions should not be considered limiting in any way. With reference to the accompanying drawings, like elements are numbered alike: The subject matter is particularly pointed out and distinctly claimed at the conclusion of the specification. The foregoing and other features, and advantages of the present disclosure are apparent from the following detailed description taken in conjunction with the accompanying drawings in which like elements may be numbered alike and:

DETAILED DESCRIPTION

Detailed descriptions of one or more embodiments of the disclosed apparatus and/or methods are presented herein by way of exemplification and not limitation with reference to the Figures.

Figure 1:
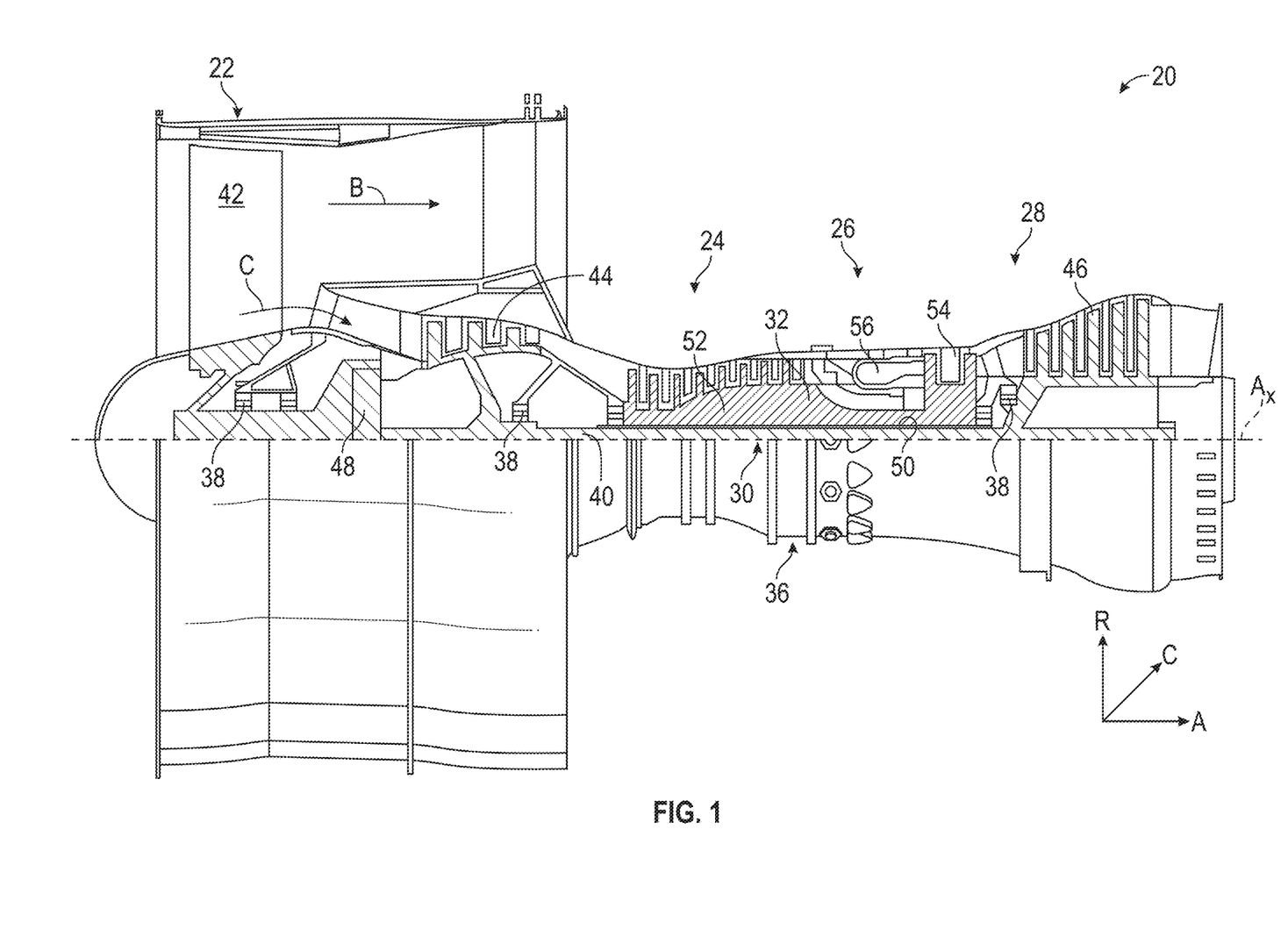
FIG. 1 is a schematic cross-sectional illustration of a gas turbine engine that may incorporate embodiments of the present disclosure.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct, while the compressor section 24 drives air along a core flow path C for compression and communication into the combustor section 26 then expansion through the turbine section 28. With reference to FIG. 1, as used herein, "aft" refers to the direction associated with the tail (e.g., the back end) of an aircraft, or generally, to the direction of exhaust of the gas turbine engine (to the right in FIG. 1). The term "forward" refers to the direction associated with the nose (e.g., the front end) of an aircraft, or generally, to the direction of flight or motion (to the left in FIG. 1). An axial direction A is along an engine central longitudinal axis $A_x$ (left and right on FIG. 1). Further, radially inward refers to a negative radial direction relative to the engine axis $A_x$ and radially outward refers to a positive radial direction (radial being up and down in the cross-section of the page of FIG. 1). A circumferential direction C is a direction relative to the engine axis $A_x$ (e.g., a direction of rotation of components of the engine; in FIG. 1, circumferential is a direction into and out of the page, when offset from the engine axis $A_x$). An A-R-C axis is shown in the drawings to illustrate the relative position of various components.

The gas turbine engine 20, as shown, includes a low speed spool 30 and a high speed spool 32 mounted for rotation about the engine central longitudinal axis $A_x$ relative to an engine static structure 36 via several bearing systems 38. It should be understood that various bearing systems 38, arranged at various locations may alternatively or additionally be provided, and the location of the bearing systems 38 may be varied as appropriate to the application and/or engine configuration.

The low speed spool 30 generally includes an inner shaft 40 that interconnects a fan 42, a low pressure compressor 44 and a low pressure turbine 46. The inner shaft 40 is connected to the fan 42 through a speed change mechanism, which in the gas turbine engine 20 is illustrated as a geared architecture or gear system 48 configured to drive the fan 42 at a lower speed than the low speed spool 30. The high speed spool 32 includes an outer shaft 50 that interconnects a high pressure compressor 52 and high pressure turbine 54. A combustor 56 is arranged between the high pressure compressor 52 and the high pressure turbine 54. An engine static structure 36 is arranged between the high pressure turbine 54 and the low pressure turbine 46. The engine static structure 36 is configured to support the bearing systems 38. The inner shaft 40 and the outer shaft 50 are concentric and rotate via bearing systems 38 about the engine central longitudinal axis $A_x$ which is collinear with their longitudinal axes.

The core airflow is compressed by the low pressure compressor 44 then the high pressure compressor 52, mixed and burned with fuel in the combustor 56, then expanded over the high pressure turbine 54 and the low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and gear system 48 may be arranged in a different configuration or arrangement than that shown in FIG. 1. For example, the gear system 48 may be located aft of the combustor section 26 or even aft of the turbine section 28, and/or the fan section 22 may be positioned forward or aft of the location of the gear system 48.

The engine 20 in one non-limiting example is a high-bypass geared aircraft engine. In some such configurations and examples, the engine 20 may be configured with a bypass ratio that is greater than about six (6), with an example embodiment being greater than about ten (10). Further, the geared architecture 48 may be configured as an epicyclic gear train, such as a planetary gear system or other gear system, with a gear reduction ratio of greater than about 2.3. Such systems may include that the low pressure turbine 46 has a pressure ratio that is greater than about five (5). In one non-limiting embodiment, the engine 20 may have a bypass ratio that is greater than about ten (10:1), a fan diameter that is significantly larger than that of the low pressure compressor 44, and the low pressure turbine 46 has a pressure ratio that is greater than about five (5:1). The low pressure turbine 46 pressure ratio is pressure measured prior to inlet of low pressure turbine 46 as related to the pressure at the outlet of the low pressure turbine 46 prior to an exhaust nozzle.

The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present disclosure is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,688 meters). The flight condition of 0.8 Mach and 35,000 ft (10,688 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °\ R)/(518.7°\ R)]^{0.5}$. The "Low corrected fan tip speed" as disclosed herein according to one non-limiting embodiment is less than about 1150 ft/second (350.5 m/sec).

Although the gas turbine engine 20 is depicted as a turbofan, it should be understood that the concepts described herein are not limited to use with the specifically described and illustrated configuration. Rather, the teachings herein may be applied to other types of aircraft engines such as, but not limited to, turbojets, turboshafts, etc.

Figure 2:
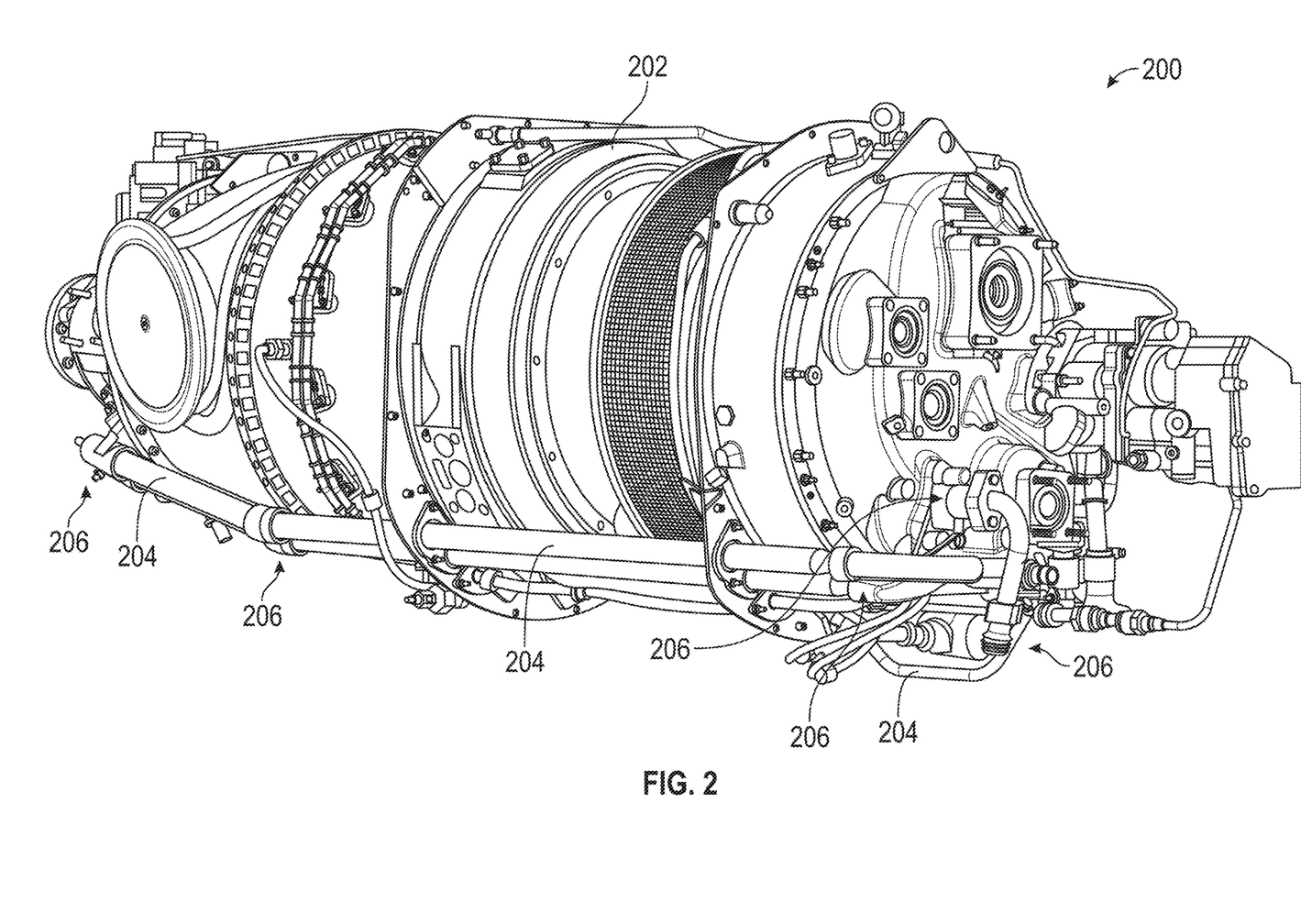
FIG. 2 is a schematic illustration of an engine having transfer tubes that may incorporate seal assemblies of the present disclosure.

Referring now to FIG. 2, a schematic illustration of an engine 200 that may incorporate embodiments of the present disclosure is shown. The engine 200 may include internal structures and components, including, but not limited to one or more engine shafts, a compressor section, a combustor section, and a turbine section. The components and internal structure are housed within an engine casing 202. Arranged external to the engine casing 202 are various structures, fluid paths, electronics, accessories and the like. For example, and as shown, a number of different transfer tubes 204 may be arranged about the exterior of the engine casing 202 and are arranged to move various fluids from and to different regions of the engine 200. The transfer tubes 204 may be configured to direct fuel, oil, or other flammable liquids from a source (e.g., fuel tank, reservoir, etc.) to a desired location (e.g., combustor, oil lubrication/cooling system, etc.). In some configurations, some of the transfer tubes 204 may be part of a closed loop fluid cycle, such as lubricating and cooling oil that is circulated through various components of the engine 200.

The transfer tubes 204 are typically metal conduits that are arranged about the exterior of the engine casing 202. At locations where the transfer tubes 204 are joined together and/or connected to the engine casing 202, fittings 206 are provided. The fittings 206 provide for connections between sections of transfer tube 204 or between a transfer tube 204 and a component or structure of the engine casing 202. Because the fittings 206 are between two sections of piping or similar structures, and are configured to carrying fluids therein, a sealed connection at the fitting 206 may be necessary to ensure no leakage of the fluids occurs. The fittings 206 thus typically include fluid seals that seal the engagement portions of the transfer tubes 204 and connections of or with the transfer tubes 204.

In operation, the seals of the fittings 206 may be exposed to the fluids that are contained within the transfer tubes 204. The fluids may be relatively high temperature fluids, and thus such seals must be configured to withstand exposure to the relatively high temperatures of the fluids (and chemical exposure thereto as well). However, in the event of combustion or fire, the temperatures within the transfer tubes 204 may exceed the material limits of the seals. As a result, the seals may fail, resulting in leakage of the fluids and/or a path for fire to travel and exit the transfer tubes 204 at the fittings 206 and propagate to other areas of the engine 200.

Figure 3A:
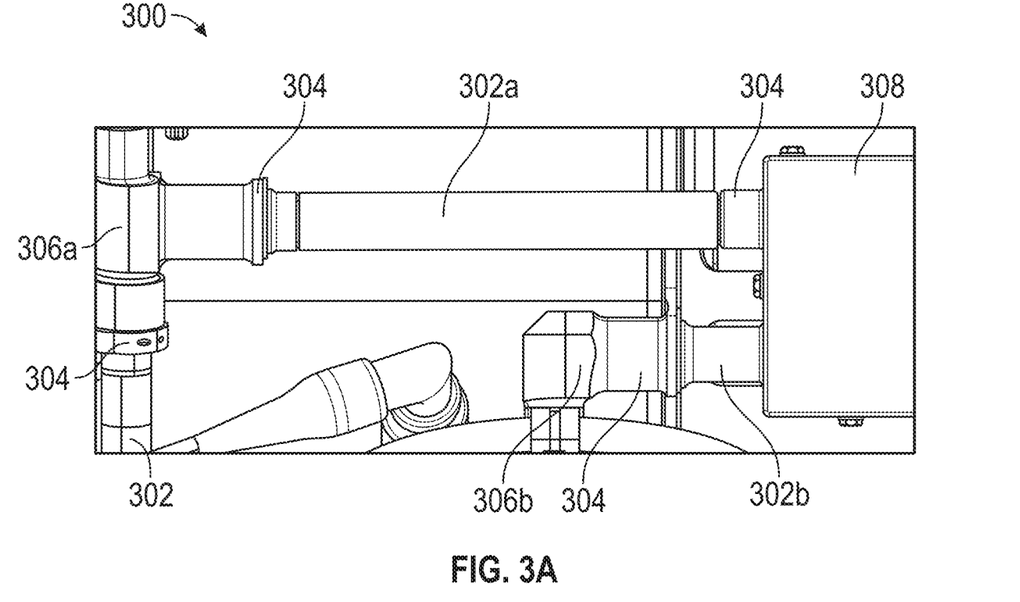
FIG. 3A is an enlarged illustration of an assembly having transfer tubes with a conventional sealing configuration.
Figure 3B:
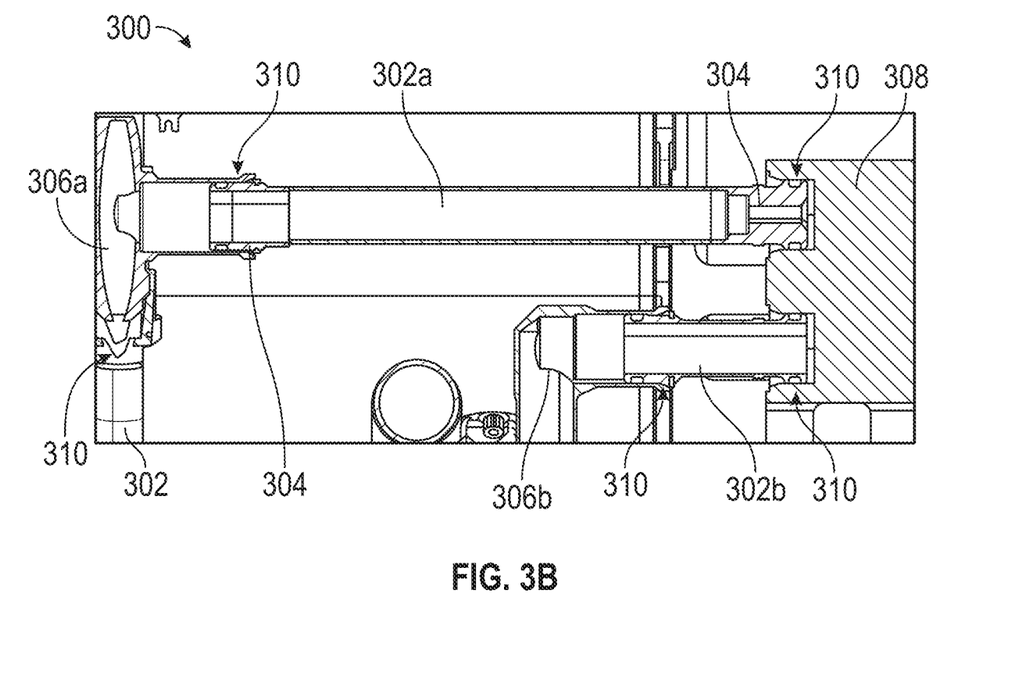
FIG. 3B is a cross-sectional view of the assembly of FIG. 3A.

Referring now to FIGS. 3A-3B, schematic illustrations of an assembly 300 of a portion of an engine having transfer tubes 302 and fittings 304 are shown. FIG. 3B illustrates a partial cross-sectional view of the configuration shown in FIG. 3A. As shown in FIGS. 3A-3B, the assembly 300 includes multipole sections of transfer tubes 302 that are joined by fittings 304 either to additional/other transfer tubes 302 and/or to other components. The transfer tubes 302 and fittings 304 may define internal conduits or flow paths for carrying and directing fluids, such as liquid fuel and/or oil and/or various gases and the like. For example, and as shown in FIGS. 3A-3B, a first transfer tube 302a is configured to provide a fluid path between a first joint 306a and a heat exchanger 308, with the first joint 306a connected to one or more other transfer tubes 302 by respective fittings 304. Also shown in FIGS. 3A-3B, a second transfer tube 302b is configured to provide a fluid path out of the heat exchanger 308 and into a second joint 306b, which may connect to other downstream systems and/or provide a liquid loop for cycling the fluid through the transfer tubes 302.

The heat exchanger 308 may be any type of heat exchanger used onboard an aircraft engine. For example, the heat exchanger 308 may be configured to thermally exchange heat from a heat load into oil that is carried within the transfer tubes 302 (302a, 302b). In some non-limiting embodiments, the heat exchanger 308 may be a fuel-oil heat exchanger. It will be appreciated that the assembly 300 of FIGS. 3A-3B is merely for example purposes, and other arrangements and/or uses of transfer tubes may implement embodiments of the present disclosure.

The fittings 304 are each configured with respective seal assemblies 310. The fittings 304 provide mechanical connection between the transfer tubes 302 and other transfer tubes 302 and/or joints 306 and/or other components (e.g., heat exchanger 308). Because the fittings 304 are configured to join two sections of transfer tube or otherwise provide a mechanical connection with a fluid conduit defined within and through the fittings 304, the fittings 304 include the seal assemblies 310 to prevent leakage of the fluid from within the fluid conduits from leaking or otherwise escaping and/or to prevent external fluids from entering the fluid within the fluid conduits. In conventional systems, the fittings 304 are provided with seal assemblies 310 that include a packing element that provides a sealing engagement between surfaces of the transfer tubes 302 and surfaces of the fittings 304.

Figure 3C:
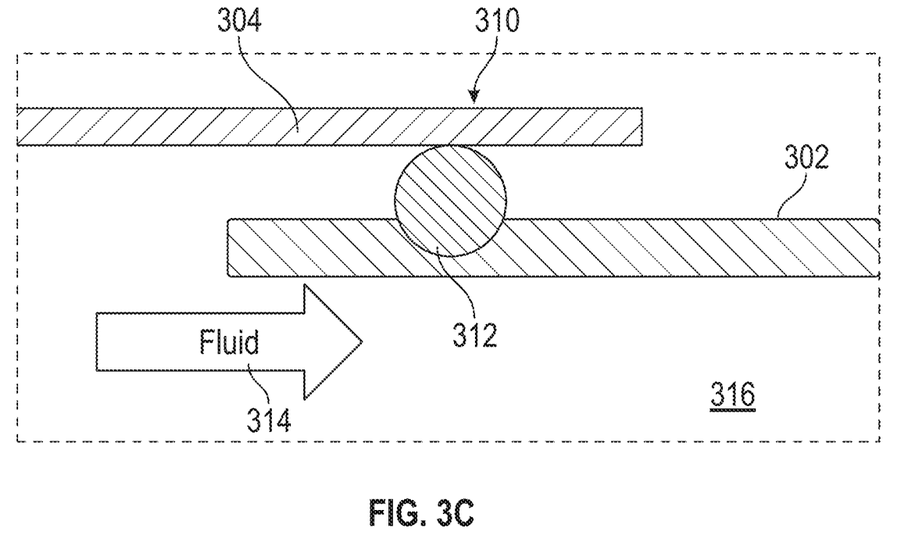
FIG. 3C is an enlarged schematic illustration of a seal assembly of the assembly of FIGS. 3A-3B.

Referring to FIG. 3C, an enlarged illustration of a seal assembly 310 is shown. The seal assembly 310 includes a packing element 312 that is arranged between an exterior surface of a transfer tube 302 and an interior surface of a fitting 304. The packing element 312 provides a seal or barrier to ensure that a fluid 314 remains within a fluid conduit 316 defined within the fitting 304 and the transfer tube 302. The packing element 312 may be a rubber or plastic O-Ring that has an interference fit with the material of the transfer tube 302 and/or the material of the fitting 304. In some configurations, the packing element 312 may be seated within an annular groove or channel formed in one or both of the transfer tube 302 and the fitting 304.

The fittings 304 and the transfer tubes 302 may be formed from metal or other high temperature materials. However, because the seal assemblies 310 are required to provide a sealing engagement between the fittings 304 and the transfer tubes 302, the packing elements 312 of the seal assemblies 310 may be formed from plastic or rubber materials. The selection of material may be selected to ensure a fluid seal by allowing for plastic deformation of the material of the packing elements 312.

In operation, the transfer tubes 302 may contain flammable liquids, such as oil or fuel. The transfer tubes 302, fittings 304, and/or the fluid 314 therein can overheat or pose a fire danger to the engine. For example, certain parts of the engine, which may include transfer tubes 302, may be exposed to high temperatures and/or flames. In certain of the high temperature areas, such as those most exposed to heat or critical zones of the engine, can lead to failure of the seal assemblies 310 and fuel, oil, or other flammable fluids can leak or accumulate. The high temperatures, such as in the event of a flame, may result in exceeding the relatively low melting point of the packing elements 312 (e.g., O-rings) are made of rubber. When exposed to such high temperatures and/or flames, the packing elements 312 may deform, soften, melt, etc. If the packing elements 312 fail due to heat application or otherwise result in loss of seal integrity, leakages may occur. The leakages of oil, fuel, or other flammable fluids into a hot environment around the engine can trigger further fire risks or critical events.

Figure 3D:
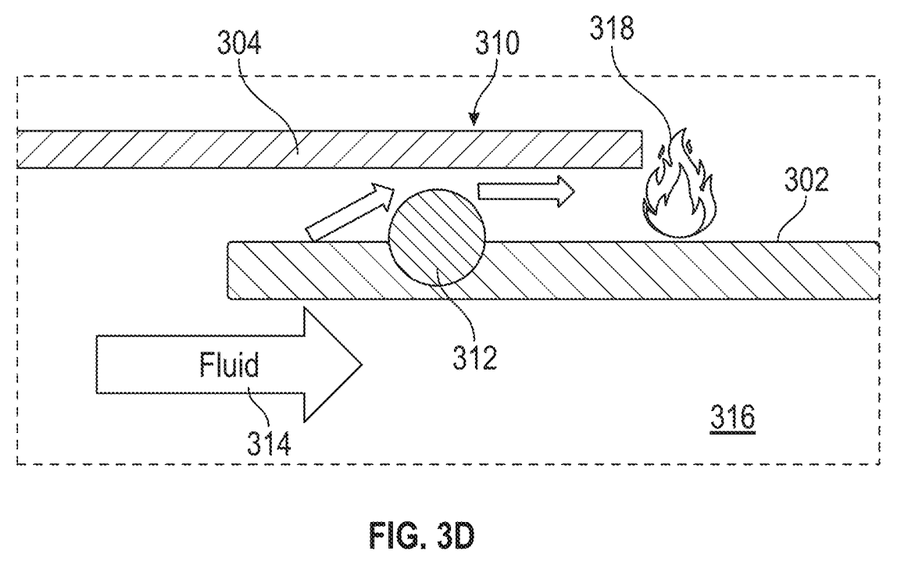
FIG. 3D illustrates the seal assembly of FIG. 3C when exposed to high temperatures and/or flame.

For example, as shown in FIG. 3D, if a flame 318 is present around the seal assembly 310, the packing element 312 may reduce in size (dry out, constrict) or may otherwise fail due to exposure to the heat and flame 318. As the packing element 312 fails, a portion of the fluid 314 may escape around the packing element 312 and enter a region or volume of the engine that is already at extreme temperatures and/or has an active flame. The fluid 314 may subsequently combust due to exposure to the flame 318, increasing the danger and/or damage. Although illustratively shown in FIG. 3D with flame present, the same outcome may occur due to excessive temperatures that exceed a melting point of the material of the packing element 312.

In accordance with embodiments of the present disclosure, improved seal assemblies for transfer tubes are provided. The improved seal assemblies incorporate a secondary seal that is configured to completely and permanently seal the interface between the transfer tube and a joining element (e.g., fitting, joint, component, etc.). As used herein, the term "fitting" refers to a connection between a transfer tube and another component (e.g., joint, inlet/outlet of a component, fluid conduit, mechanical connector, or the like). In accordance with embodiments of the present disclosure, a primary seal is provided by a packing element that is arranged with a plastic or deformed interference fit between a transfer tube and a fitting and a secondary seal is arranged on the non-fluid side of the primary seal. The secondary seal is configured to activate or otherwise form a sealed engagement in the presence of excessive heat and/or flame. The secondary seal is provided and arranged to protect the primary seal from being exposed to the excessive temperatures and/or flame.

Figure 4A:
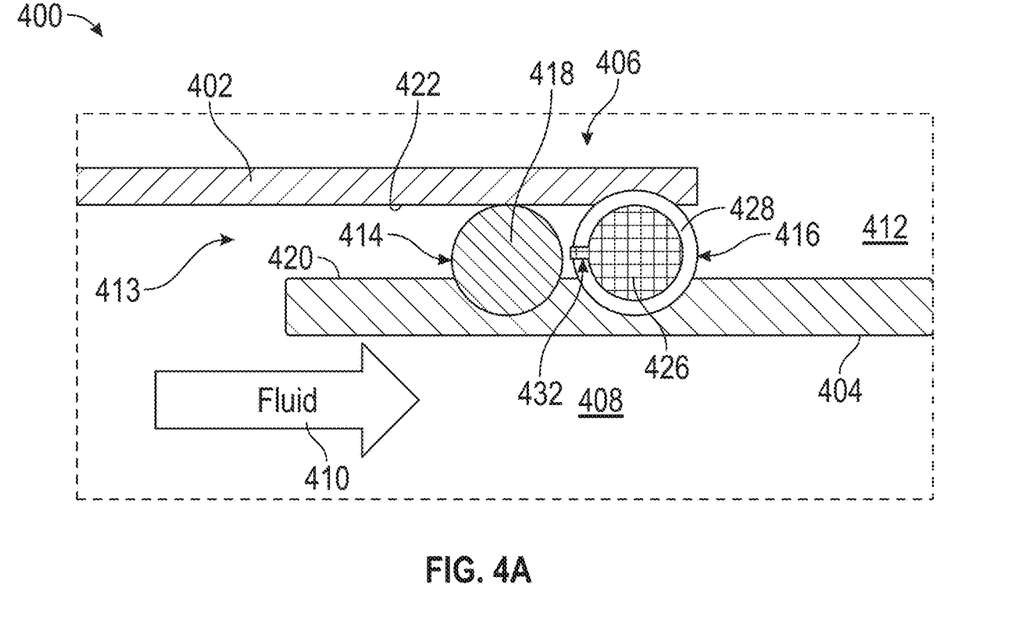
FIG. 4A is a schematic illustration of a seal assembly in accordance with an embodiment of the present disclosure.
Figure 4B:
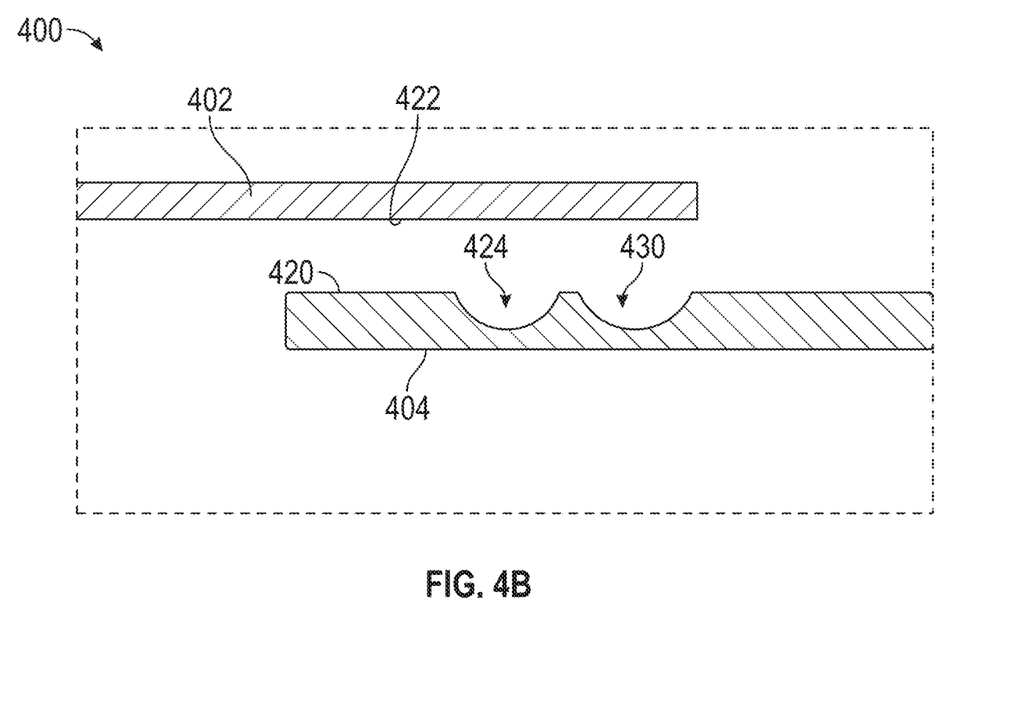
FIG. 4B illustrates the components of a connection that includes the seal assembly of FIG. 4A, with the seal assembly removed to illustrate features thereof.

Referring now to FIGS. 4A-4B, schematic illustrations of a portion of a fluid system 400 of a gas turbine engine in accordance with an embodiment of the present disclosure are shown. FIG. 4A illustrates a portion of a fitting 402 arranged proximate a portion of a transfer tube 404 with a seal assembly 406 providing a fluid seal between the fitting 402 and the transfer tube 404. FIG. 4B illustrates features of the transfer tube 404 and fitting 402 without elements of the seal assembly 406 present. The fitting 402 and transfer tube 404 are arranged to define a fluid path 408 for conveying a fluid 410, such as oil or fuel, therethrough. The seal assembly 406 is provided to sealingly and fluidly separate the fluid path 408 from an ambient environment 412, such as a volume defined by an engine casing or the like, as will be appreciated by those of skill in the art. That is, the seal assembly 406 is arranged within a gap 413 defined between the fitting 402 and transfer tube 404.

The seal assembly 406 includes a primary seal 414 and a secondary seal 416. The primary seal 414 may be a packing element 418, such as an O-ring or the like, which may be formed from rubber, plastic, or other deformable material. The primary seal 414 is configured to provide a primary sealing engagement between an outer surface 420 of the transfer tube 404 and an inner surface 422 of the fitting 402 and thus seal the gap 413. The packing element 418 of the primary seal 414 may be configured to be seated within a primary seal channel 424 defined in the outer surface 420 of the transfer tube 404, as shown in FIG. 4B. The primary seal 414 is arranged to contact the fluid 410 within the fluid system 400 and prevent leakage of the fluid 410 through the space between the fitting 402 and the transfer tube 404. That is, the primary seal 414 is exposed to the fluid 410 on one side, and without the secondary seal 416, would be exposed to the ambient environment 412 on an opposite side. However, because the packing element 418 is formed form a material having a relatively low melting point, exposure to high temperatures and/or flame from the ambient environment 412 can result in failure of the primary seal 414.

The fluid system 400 includes the secondary seal 416 arranged between the primary seal 414 and the ambient environment 412. The secondary seal 416 is an expansion seal or element that is configured to expand when exposed to high temperatures (or flame). As the secondary seal 416 expands due to exposure to the high temperature, the secondary seal 416 will engage with and permanently seal the gap 413. The secondary seal 416 includes an expansion core 426 arranged within an outer shell 428. The secondary seal 416 may be configured to be seated within a secondary seal channel 430 (shown in FIG. 4B) that is defined on the outer surface 420 of the transfer tube 404. The expansion core 426 of the secondary seal 416 may be formed from a plastic material that is selected to expand when subject to a predetermined temperature threshold. For example, and without limitation, the expansion core 426 may be formed from fluoroelastomers with a high expansion ratio, perfluoroelastomers, thermoplastics, elastomers, polyimide-based plastics, polyamidimide-based plastics, materials selected from a class of materials of organic origin with fluorine replacing the hydrogen sites, ceramics in an intermediate state of curing, or any material having a thermal expansion coefficient an order of magnitude larger than the material of the outer shell 428 (e.g., metal). In accordance with some embodiments, the expansion core 426 of the secondary seal 416 may be configured to expand when exposed to temperatures of 800° F. or greater. In some embodiments, the threshold temperature of the expansion of the material of the expansion core 426 may be 1,200° F. or greater. In still further embodiments, the threshold temperature of the expansion of the material of the expansion core 426 may be 2,000° F. or greater (e.g., emergency fire protection temperatures).

As the expansion core 426 expands, it will apply force to the outer shell 428. The outer shell 428 of the secondary seal 416 may be formed from a metal or other high-temperature material. In some configurations, and as shown, the outer shell 428 may include a split-line 432. The split-line 432 may be a gap in the material of the outer shell 428 to ensure that, as the force of the expansion of the expansion core 426 acts on the outer shell 428, the outer shell 428 will be pressed into material contact and engagement with the material/surfaces of the fitting 402 and the transfer tube 404. The selection of material of the expansion core 426 may be such that during expansion due to heat exposure, the expansion core 426 will apply sufficient force to expand the outer shell 428.

As the outer shell 428 expands, the material of the outer shell 428 will engage in an interference fit with the material of the fitting 402 and the transfer tube 404. As such, a permanent sealing may be generated that protects the primary seal 414 from exposure to the heat/temperature/flames. The material of the outer shell 428 may be selected to have a melt temperature above the threshold temperature of the expansion core 426. For example, and without limitation, the outer shell 428 may be made from materials having melting temperatures of greater than 2,000° F. (e.g., emergency fire protection temperatures). Because the outer shell 428 may be made from a metal, the expansion of the expansion core 426 will form a metal-metal-metal seal or contact/engagement between the fitting 402, the outer shell 426, and the transfer tube 404. As such, ingress of flames or high temperatures from the ambient environment 412 will be prevented from entering the gap 413 and damaging the primary seal 414. The expanded secondary seal 416 will also provide a redundant seal to prevent the fluid 410 from flowing through the gap 413 and entering the ambient environment 412.

In accordance with some embodiments, the expansion core 426 may be formed from various materials having thermal expansion coefficients that are an order of magnitude greater than metals, such as a metal of the outer shell 428. In accordance with some embodiments, and without limitation, the material of the outer shell 428 may be selected from copper, steel, stainless steel, or other metals having relatively high melting temperatures and/or are selected based on additional criteria, such as malleability, corrosion resistance, or the like. In some embodiments, the selection of the material of the expansion core 426 may be to ensure an expansion of sufficient size to apply a desired force on the outer shell 428. For example, and without limitation, the expansion core 426 may be formed from a material having a thermal expansion ratio that is at least seven times a thermal expansion ratio of the outer shell 428 (or the materials of the fitting 402 and the transfer tube 404).

It will be appreciated that, in some embodiments, the primary seal channel 424 and/or the secondary seal channel 430 may be formed in the inner surface of the fitting 402 rather than on the transfer tube 404. In still other embodiments, each of the fitting 402 and the transfer tube 404 may include respective primary and secondary seal channels such that the packing element 418 of the primary seal 414 and the secondary seal 416 are seated within a channel in each of the fitting 402 and the transfer tube 404. Furthermore, as shown, the secondary seal 416 has a circular cross-sectional shape, and the secondary seal channel 424 has a complementary shape. In other embodiments, the secondary seal may have a different geometric shape, such as square, rectangular, trapezoidal, or the like. It will be appreciated that the seal assembly 406 is a hoop structure, with each of the primary seal 414 and the secondary seal 416 providing a seal between the surfaces 420, 422 of the transfer tube 404 and the fitting 402.

Figure 5A:
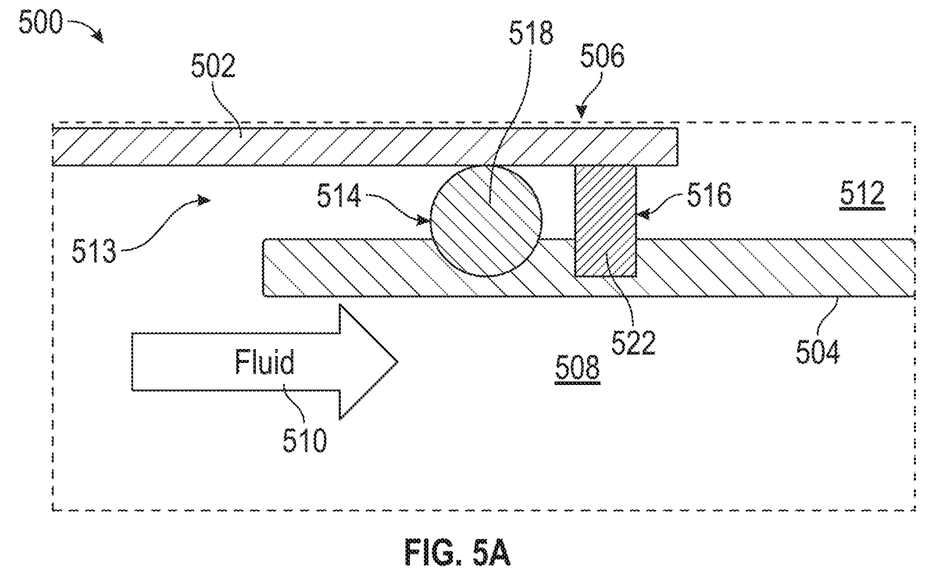
FIG. 5A is a schematic illustration of a seal assembly in accordance with another embodiment of the present disclosure.
Figure 5B:
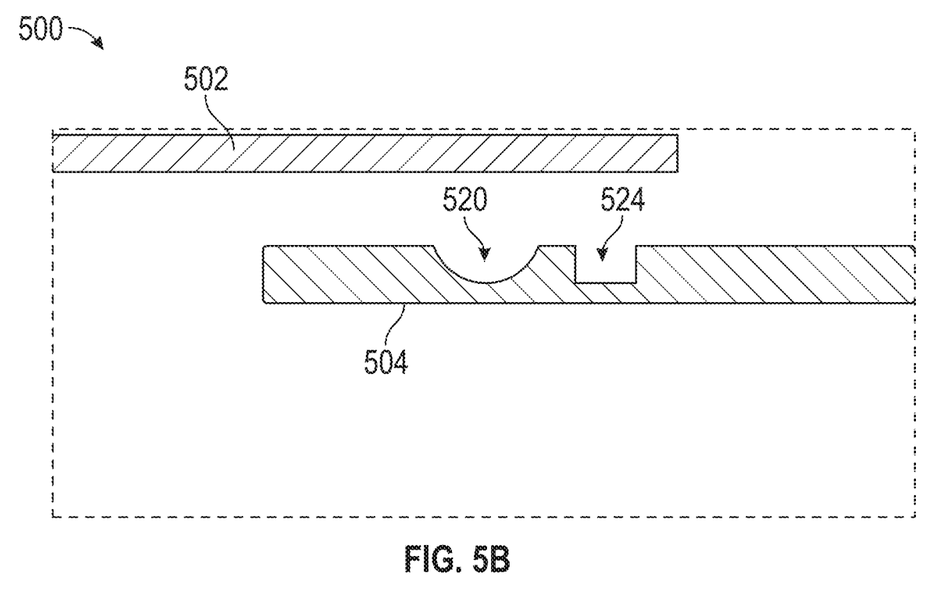
FIG. 5B illustrates the components of a connection that includes the seal assembly of FIG. 5A, with the seal assembly removed to illustrate features thereof.

Referring now to FIGS. 5A-5B, schematic illustrations of a portion of a fluid system 500 of a gas turbine engine in accordance with another embodiment of the present disclosure are shown. FIG. 5A illustrates a portion of a fitting 502 arranged proximate a portion of a transfer tube 504 with a seal assembly 506 providing a fluid seal between the fitting 502 and the transfer tube 504. FIG. 5B illustrates features of the transfer tube 504 and fitting 502 without elements of the seal assembly 506 present. The fitting 502 and transfer tube 504 are arranged to define a fluid path 508 for conveying a fluid 510, such as oil or fuel, therethrough. The seal assembly 506 is provided to sealingly and fluidly separate the fluid path 408 from an ambient environment 512, such as a volume defined by an engine casing or the like, as will be appreciated by those of skill in the art. That is, the seal assembly 506 is arranged within a gap 513 defined between the fitting 502 and transfer tube 504.

The seal assembly 500 may be similar to that shown and described with respect to FIGS. 4A-4B, and thus like features may not be described in detail or specifically labeled, for simplicity and clarity. Similar to the seal assembly 406 of FIGS. 4A-4B, the seal assembly 506 is formed with a primary seal 514 and a secondary seal 516. The primary seal 514 may be arranged as a packing element 518 and is substantially similar to that of the seal assembly 406 of FIGS. 4A-4B. The packing element 518 is seated in a primary seal channel 520 formed in the transfer tube 504. Similarly, in this embodiment, the secondary seal 516 is formed as an expansion band 522 that is seated in a respective secondary channel 524. As with the prior described embodiment, the respective seal channels may be formed in the transfer tube 504, the fitting 502, or a combination thereof. As shown, the secondary seal 516 has a rectangular cross-sectional shape, and the secondary seal channel 524 has a complementary shape. In other embodiments, the secondary seal may have a different geometric shape, such as circular, trapezoidal, or the like.

The expansion band 522 may be formed from a material having a thermal expansion that is greater than a thermal expansion of the transfer tube 504 and/or the fitting 502. In one non-limiting example, the expansion band 522 may be formed from nitinol. As such, when the expansion band 522 of the secondary seal 516 is exposed to high temperatures and/or flame, the expansion band 522 will expand to engage with the fitting 502 and the transfer tube 504 in an interfering fashion. Accordingly, a seal is provided between the ambient environment 512 and the internal fluid path 508 defined within the fitting 502 and the transfer tube 504.

In accordance with embodiments of the present disclosure, seal assemblies are provided to seal at junctions and connections between elements and structures of fluid flow paths, such as transfer tube assemblies for gas turbine engines. The seal assemblies include a primary seal that is formed from a plastic or rubber material that provides a fluid seal between a transfer tube and a fitting to prevent leakage of a fluid within the transfer tube into an ambient environment. The primary seal may be replaceable without damaging the fitting and/or transfer tube. However, the primary seal may not be able to withstand temperatures of a fire or other high temperature event (e.g., greater than 800° F.) and/or flames that are potentially present in an ambient environment (e.g., within an engine casing). To protect the primary seal from exposure to such temperatures and/or flames, the seal assemblies include a secondary seal. The secondary seal may be a single-use component that is configured to expand and form a complete, mechanical seal at a location between the primary seal and the ambient environment. In normal operation, the secondary seals of the present disclosure may provide a back-up or redundant seal to the primary seal. However, upon exposure to heat/flame, the secondary seal will expand to form a complete fluid seal to prevent liquids or gases from interacting with the primary seal.

Advantageously, embodiments of the present disclosure provide for improved sealing assemblies for gas turbine engines, and specifically to transfer or fluid tubes/conduits of the engines. In accordance with embodiments, the seal assemblies include a primary seal and a secondary seal. The primary seal is configured to provide a fluid seal to prevent fluid from leaking out of the transfer tube/fitting/connection and into an ambient environment. The secondary seal is configured to provide a fluid seal to prevent fluid, high temperatures, or flame from propagating into contact with the primary seal, thus protecting the primary seal and preventing failure thereof. Embodiments of the present disclosure provide a fail-safe sealing mechanism to prevent failure of the primary seal.

In some embodiments, the secondary seal may be formed from an expansion core that is contained with an outer shell. The expansion core is selected from materials that will expand when exposed to temperatures of 800° F. or greater and apply an outward force to expand the outer shell into engagement with surfaces of a fitting and a transfer tube, thus forming a permanent seal therebetween. The formed seal can thus protect the primary seal, and prevent leakage of fluid from a flow path and/or intrusion of high temperatures/flame into the flow path. In other embodiments, the secondary seal may be formed from a thermal expansion band that expands into engagement with the fitting and transfer tube when exposed to high temperatures and/or flame. As such, a fluid and thermal seal may be formed by the secondary seals of the present disclosure to protect the primary seals.

As used herein, the term "about" and "substantially" are intended to include the degree of error associated with measurement of the particular quantity based upon the equipment available at the time of filing the application. For example, these terms may include a range of ±8%, or 5%, or 2% of a given value or other percentage change as will be appreciated by those of skill in the art for the particular measurement and/or dimensions referred to herein. Further, the terms "about" and "substantially", when associated with non-numerical limits, are intended to include degrees of errors and/or minor variations as would be apparent to those of skill in the art when considering such concepts (e.g., shapes, relative arrangements, etc.).

The terminology used herein is for the purpose of describing particular embodiments only and is not intended to be limiting of the present disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof. It should be appreciated that relative positional terms such as "forward," "aft," "upper," "lower," "above," "below," "radial," "axial," "circumferential," and the like are with reference to normal operational attitude and should not be considered otherwise limiting.

While the present disclosure has been described with reference to an illustrative embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A gas turbine engine comprising:
 an engine core having a compressor section, a combustor section, and a turbine section;
 an engine casing housing the engine core;
 a transfer tube arranged on an exterior of the engine casing and configured to define a fluid conduit for fluid to be transferred about the engine core;
 a fitting connected to the transfer tube; and
 a seal assembly arranged between a surface of the fitting and a surface of the transfer tube, the seal assembly providing a fluid seal between the fluid conduit and an ambient environment at a connection between the fitting and the transfer tube, wherein the seal assembly comprises:
  a primary seal arranged in a gap between the fitting and the transfer tube and configured to provide a fluid seal between the surface of the fitting and the surface of the transfer tube; and
  a secondary seal arranged in the gap between the primary seal and an ambient environment, wherein the secondary seal is configured to expand into engagement with the fitting and the transfer tube when exposed to temperatures of at least 800° F.

2. The gas turbine engine of claim 1, wherein the primary seal is formed from at least one of rubber or plastic.

3. The gas turbine engine of claim 1, wherein the secondary seal comprises an expansion core and an outer shell.

4. The gas turbine engine of claim 3, wherein the expansion core has a thermal expansion ratio that is greater than a thermal expansion ratio of the outer shell.

5. The gas turbine engine of claim 4, wherein expansion ratio of the expansion core is at least seven times the expansion ratio of the outer shell.

6. The gas turbine engine of claim 3, wherein the outer shell comprises a split-line that separates during expansion of the expansion core.

7. The gas turbine engine of claim 3, wherein the expansion core is formed from a fluoroelastomer.

8. The gas turbine engine of claim 3, wherein the outer shell is formed from a metal.

9. The gas turbine engine of claim 1, wherein at least one of the transfer tube and the fitting comprise a primary seal channel for seating the primary seal and a secondary seal channel for seating the secondary seal.

10. The gas turbine engine of claim 1, wherein the secondary seal comprises an expansion band.

11. The gas turbine engine of claim 10, wherein the expansion band is formed from nitinol.

12. The gas turbine engine of claim 1, wherein the secondary seal forms an interference fit with surfaces of the transfer tube and the fitting after exposure to the temperatures of at least 800° F.

13. A transfer tube assembly for use on a gas turbine engine comprising:
 a transfer tube configured to define a fluid conduit for fluid to be transferred therethrough;
 a fitting connected to the transfer tube; and
 a seal assembly arranged between a surface of the fitting and a surface of the transfer tube, the seal assembly providing a fluid seal between the fluid conduit and an ambient environment at a connection between the fitting and the transfer tube, wherein the seal assembly comprises:
  a primary seal arranged in a gap between the fitting and the transfer tube and configured to provide a fluid seal between the surface of the fitting and the surface of the transfer tube; and
  a secondary seal arranged in the gap between the primary seal and an ambient environment, wherein the secondary seal is configured to expand into engagement with the fitting and the transfer tube when exposed to temperatures of at least 800° F.

14. The transfer tube assembly of claim 13, wherein the primary seal is formed from at least one of rubber or plastic.

15. The transfer tube assembly of claim 13, wherein the secondary seal comprises an expansion core and an outer shell.

16. The transfer tube assembly of claim 15, wherein the expansion core has a thermal expansion ratio that is greater than a thermal expansion ratio of the outer shell.

17. The transfer tube assembly of claim 16, wherein expansion ratio of the expansion core is at least seven times the expansion ratio of the outer shell.

18. The transfer tube assembly of claim 15, wherein the outer shell is formed from a metal.

19. The transfer tube assembly of claim 13, wherein at least one of the transfer tube and the fitting comprise a primary seal channel for seating the primary seal and a secondary seal channel for seating the secondary seal.

20. The transfer tube assembly of claim 13, wherein the secondary seal comprises an expansion band.

\* \* \* \* \*